Jan. 5, 1965     F. A. BERNBURG ETAL     3,163,902
ROPE CLAMPS
Filed July 27, 1962     2 Sheets-Sheet 1
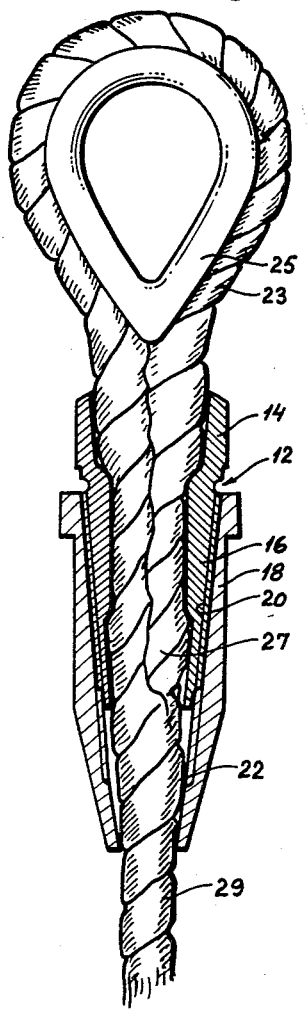
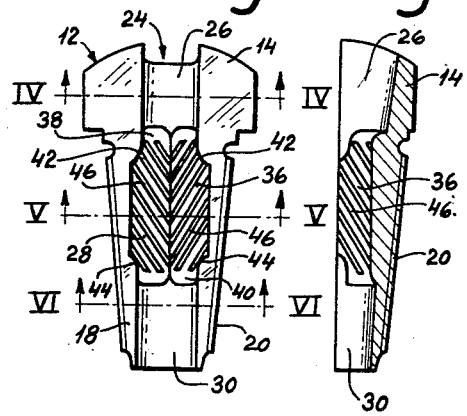
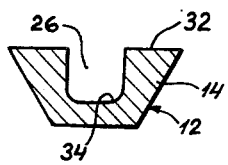
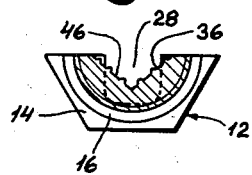
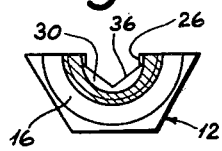

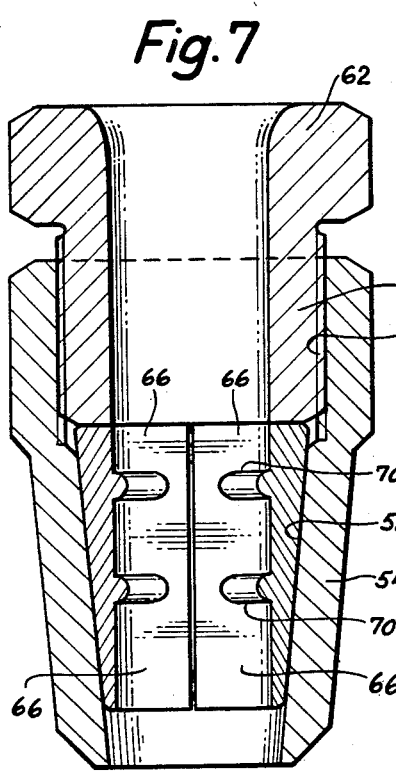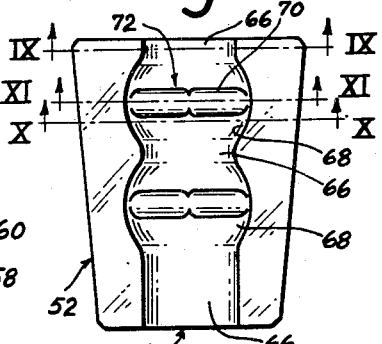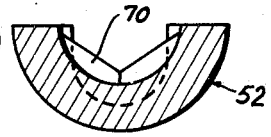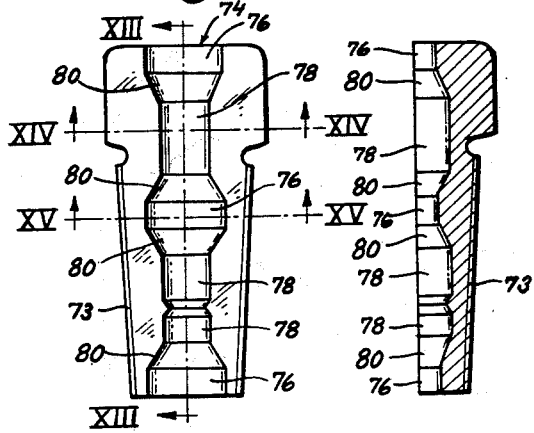

United States Patent Office 3,163,902
Patented Jan. 5, 1965

3,163,902
ROPE CLAMPS
Frantz Adolph Bernburg, Copenhagen, and Knud Aage Faber, Bronshoj, Denmark, assignors to Malodan A/S, Copenhagen, Denmark, a company of Denmark
Filed July 27, 1962, Ser. No. 212,947
Claims priority, application Denmark July 28, 1961
10 Claims. (Cl. 24—126)

This invention relates to a rope clamp for gripping or securing one or more rope portions, for example for connecting two rope portions with each other, and more particularly to a rope clamp comprising at least two clamp members adapted to be pressed towards each other, and means adapted to keep said two clamp members pressed towards each other, each said clamp member being provided with a longitudinal groove forming, when the two clamp members are arranged opposite each other, together with the corresponding groove of the other clamp member a passage in which the rope portion or portions may be received and clamped by the two clamp members being pressed towards each other.

The ideal demand on such a rope clamp is that the rope clamp ought with security to grip the rope portion or rope portions so firmly that in case the rope portion or the rope portions are exposed to very high pulls the rope or one of the ropes itself will break outside the rope clamp without the rope portion or portions slides within the clamp. Although a very great number of different constructions of rope clamps of the type stated exist, only very few hitherto known rope clamps are able to meet this demand.

The object of the invention is to provide such an improvement of rope clamps of the said type that their ability firmly to secure the rope portion or rope portions is essentially increased and so that most hitherto known rope clamps of the type stated can when amended into accordance with the present invention meet with certainty the above said ideal demand.

This invention is based on the acknowledgement that far most ropes, hemp ropes as well as nylon ropes, cables, and wire ropes with and without a core of hemp or another soft material are able to be flattened more or less without their strength being essentially influenced. When, therefore, a rope portion is arranged in a rope clamp of the type stated and in which at least the groove of the one clamp member is formed with at least two groove portions having different cross sections and so that one of said groove portions has a greater width and a smaller depth than the other of said groove portions the parts of a rope portion received in the two different groove portions will be deformed in different ways, as the rope portion part received in the groove portion having the greatest width and the smallest depth will be so deformed that it gets more flat and broader than the rope portion part received in the other groove portion whereby shoulders or contact faces are formed on the rope which effectively resist a longitudinal displacement of the rope portion in the groove, and, consequently, in the rope clamp.

In this connection this invention is based also on the acknowledgement that even if it is comparatively easy to deform the rope in the above said manner by a pressure perpendicular to the rope it is far more difficult to obtain a corresponding deformation by a longitudinal pull in the rope, and, therefore, a risk of the deformed rope portion parts being displaced in the longitudinal direction of the rope is very small, at least provided the clamp is otherwise able to offer an essential resistance against a longitudinal sliding of the rope within the clamp.

In order that the invention may be more readily understood, reference is had to the accompanying drawings, which illustrate, by way of example, three different forms of rope clamps constructed in accordance therewith.

In the drawings:
FIG. 1 is a sectional elevation of a first embodiment of the improved rope clamp used for fastening a wire rope round a thimble,
FIG. 2 is a side elevational view of a clamp member of the clamp shown in FIG. 1,
FIG. 3 is a longitudinal section through the clamp member shown in FIG. 2,
FIGS. 4 to 6 are cross sections taken on lines IV—IV, V—V and VI—VI respectively of FIG. 2,
FIG. 7 is a sectional elevation of a second embodiment of the improved rope clamp,
FIG. 8 is a side elevational view of a clamp member of the clamp shown in FIG. 7,
FIGS. 9 to 11 are cross sections taken on lines IX—IX, X—X, and XI—XI respectively of FIG. 8,
FIG. 12 is a side elevational view of a third embodiment of the improved clamp member,
FIG. 13 is a longitudinal sectional view taken on line XIII—XIII of FIG. 12, and
FIGS. 14 and 15 are sectional views taken on lines XIV—XIV and XV—XV respectively of FIG. 12.

The rope clamp shown in FIGS. 1 to 6 is a wire rope clamp of the type comprising two clamp members 12 to be inserted in an outer casing 18. Each clamp member 12 is provided with a head 14 and a conical body 16, the latter being threaded with threads on the outer side. When two such clamp members 12 have been arranged in embracing relation with respect to one or more rope portions the pointed end of the clamp member unit consisting of the two clamp members is inserted into the outer casing 18, see FIG. 1, which is provided with a conical bore 20 the conicity of which corresponds to the conicity of the clamp member body 24 and which ends in a cylindrical end bore 22. The length of the conical bore 20 is at least equal to the length of the clamp member bodies 16 and is provided with an internal thread corresponding to the thread of the clamp member bodies 16.

The heads 14 of the clamp members 12 are so designed that when the two clamp members abut each other, together they have a polygonal cross section, see FIGS. 4 to 6, and they can thus be retained pressed towards each other, for example in a vice or a wrench. The upper portion of the outer casing 18 is also polygonal so that it can be grasped by means of a wrench.

When the conical bodies 16 of the clamp members 12 pressed towards each other are inserted into the outer casing 18, and the clamp members are held, for example in a vice, it is possible by means of a wrench to turn the outer casing 18 relative to the clamp members 12, thereby threading the outer casing upwards along the clamp members which are thereby forced further towards each other by a very great pressure.

Each clamp member 12 is provided on its inner side facing the other clamp member with a longitudinal groove 24 extending over the whole length of the clamp member and adapted to receive the rope portion to be clamped or one of the two rope portions to be connected to each other.

In FIG. 1 is shown how the rope clamp is used for fastening a steel wire rope 23 round a thimble 25. The wire rope is first placed round the thimble 25 with the free or short rope portion 27 extending a distance along the rope portion 29 leading to the thimble 25, the two clamp members 12 have been arranged in clamping relation to the rope portions with the short rope portion extending at least to the lower end of the clamp members 12 and so that each rope portion 27 and 29 engages a clamp member groove 24. Then the two clamping members 12 are pressed towards each other as described above.

In the embodiment shown in FIGS. 1 to 6 each groove 24 comprises three groove portions 26, 28 and 30. The groove portion 26 is located in the head 14 of the clamp member 12 and is given the cross section shown in FIG. 4 with a rounded bottom 34, a width at the flat outer side 32 of the clamp member 12 facing the other clamp member which is at least equal to the thickness of the rope 23 and with a depth of about the same size.

The groove portion 26 is followed by the groove portion 28 which has an almost angular cross section, see FIG. 5, as this groove portion 28 is defined by two flat or slight concavely curved inclined side faces 36. The distance between these side faces at the outer side 32 of the clamp member 12 is essentially greater than the width of the groove portion 26, but the greatest depth of the groove portion 28 is somewhat smaller than the depth of the groove portion 26. Thus the sectional area of the groove portion 28 is smaller than the sectional area of the groove portion 26 and is equal to or only relatively little greater than the sectional area of the rope 23 for which the rope clamp is dimensioned.

The third groove portion 30 has again a rounded cross section, see FIG. 6, with a width at the clamp member face 32 smaller than the width of the groove portion 28 but greater than the width of the groove portion 26. The depth of the groove portion 30 is greater than the depth of the groove portion 28, but a little smaller than the depth of the groove portion 26. The sectional area of the groove portion 30 is somewhat bigger than the sectional area of the groove portion 28, but a little smaller than the sectional area of the groove portion 26.

The portions of the inclined side faces 36 which are opposite to the groove portions 26 and 30 pass over in these groove portions by gentle transitions 38 and 40 respectively, see FIGS. 2 and 3, whereas the portions of the faces 36 outside the groove portions 26 and 30 pass over in the side faces of these groove portions by convexed curved surfaces 42 and 44 respectively forming shoulders at the transitions between the groove portion 28 and the groove portions 26 and 30.

When the rope portions 27 and 29, see FIG. 1, have been placed within their respective clamp member groove 24 and the two clamp members 12 have been pressed towards each other by means of the outer casing 18, the rope portion arranged in the groove portion 26 of one of the clamp members 12 will only be compressed with a comparatively low pressure so that it is prevented that the heads 14 of the clamps 12 arranged outside the outer casing 18, are broken. Also the rope portions arranged in the groove portions 30 will only be deformed in a small degree. On the other hand, the rope portions arranged within the groove portions 28 will be pressed together by very great forces and thereby be strongly deformed and in another direction of the deformation taking place in the groove portions 30, as in the groove portions 28 an essential flattening of the rope portions takes place. Therefore, if the rope portions 27 and 29 shall slide in the rope clamp the pull in the rope portion 29 must be so heavy that it is not only as is the case in the previously known rope clamps able to overcome the heavy forces of friction provided by the pressing together of the clamp members, but must in addition be able to deform the rope portions at the transitions between the three groove portions 26, 28 and 30 in such a manner that the cross sections of the deformed rope portions which owing to the deformation have provided shoulders at the shoulders 42 and 44 of the groove 24 have to be re-shaped by the passage of said last shoulders. The resistance of the rope to such a deformation is very strong, however, and causes, therefore, an essential increase of the clamping effect of the rope clamp compared with rope clamps having clamp member grooves of hitherto used shapes.

In the embodiment shown the inclined faces 36 of the groove portion 28 are provided with inclined transverse ribs 46. Such ribs may be of importance especially in case the clamp members 12 are made from a material, for example from a soft aluminium alloy, the yield point of which is lower than that of steel. In such cases during the pressing together of the clamp members 12 such high surface pressures will arise at the edges of the ribs contacting the rope portions that the yield point of the material used for the clamp members 12 will be surpassed, and the rib material will penetrate in between the strands of the rope portions and produce a kind of welding between the rope portions and the clamp members whereby the clamping effect of the rope clamp is still further increased.

It has been proved in practice that a rope clamp as the one shown in FIGS. 1 to 6 can, at all events in connection with wire rope diameters up to 10 to 14 mm., with certainty hold the rope portions without the latter slide in the clamp even if the pull in the rope is so heavy that the rope itself breaks, and in that case the breaking will take place outside the rope clamp.

The rope clamp shown in FIGS. 7 to 11 is of the type provided with two clamp members 52 having conical outsides and adapted to be inserted into an outer casing 54, see FIG. 7; provided with a bore having a conical portion 56, the conicity of which corresponds to the conicity of the clamp members 52. Above the conical bore portion 56 the outer casing is provided with a cylindrical threaded bore portion 58 in which a hollow screw 60 can be screwed in for pressing the clamp members 52 into the conical bore portion 56 and thereby for pressing the two clamp members 52 together. Outside the outer casing 54 the screw 60 is provided with a nut shaped head 62. Preferably a washer (not shown) provided with a center hole is inserted between the lower end of the screw 60 and the upper ends of the clamp members 52.

Each clamp member 52 is provided with a longitudinal groove 64 including groove portions 66 having the cross section shown in FIG. 9 and having a width corresponding to the diameter of the corresponding rope and a depth somewhat smaller than the diameter of the rope. Between said groove portions 66 are to both sides extended groove portions 68 having the cross section shown in FIG. 10. The side walls of the groove portions 68 are concavely rounded, see FIG. 8. In the middle of each extended groove portion 68 a rib 70 is provided extending inwards from the side walls and upwards from the bottom of the groove portions 68 and having such a shape that the groove portion 72 defined by each said rib 70 has an almost V-shaped cross section, see FIGS. 10 and 11.

The embodiment shown in FIGS. 7 to 11 is particularly intended for relatively thick wire ropes, for example steel wire ropes having a diameter bigger than 10–12 mm. which ropes demand relatively heavier pressures for being deformed than thinner wire ropes. The groove portions 28 defined by the ribs 70 and corresponding to the groove portions 28 of the embodiment shown in FIGS. 1 to 6, have, however, a relatively small extend in the longitudinal direction of the clamp members and are, therefore, able to procure heavy surface pressures on the rope portions and, thereby, able to procure the necessary transverse deformation of the rope portions. Two rope portions clamped in a rope clamp as shown in FIGS. 7 to 11 will, therefore, in the same manner as is the case in connection with the embodiment shown in FIGS. 1 to 6, be provided with parts, viz. the parts arranged in the groove portions 72 and partly in the groove portions 68, which are flattened in the transverse direction compared with the rope portions arranged in the further groove portions. Hereby the clamping effect explained above in connection with the embodiment of FIGS. 1 to 6 is also obtained by the embodiment of FIGS. 6 to 11.

Also by the embodiment shown in FIGS. 7 to 11 it may be appropriate that the clamp members 52 are made from a material, for example a soft aluminium alloy, having a yield point essentially lower than that of steel, whereby it is obtained that the parts of the ribs 70 directly contacting the rope portions are exposed to such high surface pressures that the rib material here flows and penetrates in between the strands of the wire rope so that a kind of welding is produced.

FIGS. 12 to 15 show an embodiment of a clamp member 73 intended for being used together with a corresponding clamp member and to be inserted into an outer casing corresponding to the outer casing 18 in the embodiment shown in FIG. 1. This clamp member 73 is provided with a longitudinal groove 74 having at each end and at the middle thereof groove portions 76 each having an almost oval cross section with a small width and a great depth, see FIG. 15. Between the groove portions 76 the groove 74 comprises groove portions 78 each also having an oval cross section, see FIG. 14, but with a great width and a small depth. Between each groove portion 78 and each groove portion 76 following the same the groove 74 is further provided with transition groove portions 80 the walls of which form a gentle transition between the walls of the two groove portions 76 and 78.

All groove portions have almost the same sectional area which is a little bigger than the sectional area of a rope having the rope diameter for which the rope clamp is dimensioned. The depth of all groove portions 76, 78 and 80 is smaller than the rope diameter.

The embodiment shown in FIGS. 12 to 15 is particularly adapted for ropes which are relatively easy to deform, for example for hemp ropes or ropes made from nylon threads, but it may also be used for wire ropes made from steel or another metal. When the clamp members 72 are to be used for wire ropes it is most suitable, however, that the groove portions 78 providing the transverse flattening of the wire rope portions are provided with an angular cross section as is the case in connection with the groove portion 36 of the embodiment of FIGS. 1 to 6.

It should be noted that in the same rope clamp, clamp members of different shape and having different shaped grooves may be used. Often it is sufficient that only one clamp member is provided with a groove having groove portions of different shape as explained above.

It should also be noted that it is not strictly necessary that there is a gentle or rounded transition between two different shaped groove portions, but such transitions are normally to be preferred since sharp edged transitions may in certain cases cause a damaging of the rope within the rope clamp so that the rope can break within the latter.

Above, the invention has been explained in connection with rope clamps adapted for mutual connection of two rope portions, but the invention may also be used in connection with rope clamps for clamping only one rope portion, for example as cable end clamps. All above explained embodiments may be used for said purpose when amended amongst other thereby that the depth of the groove portion having the greatest depth is at the highest equal to half the diameter of the rope.

Further according to all described embodiments the clamp members have to be pressed together by being inserted in an outer casing, but the clamp members may be pressed together in many other ways. It is only necessary that means are provided by which the clamp members are retained pressed towards each other when said pressing together is finished.

Thus the two clamp members may be adapted to be maintained pressed together by means of bolts or screws. The one clamp member can also be made as a wedge adapted by insertion into an outer casing to press against a side wall of the casing, preferably a side wall shaped as a groove. In this case this side wall serves as the other clamp member. In a rope clamp having one or more wedge members adapted to serve as clamp members the groove having different cross sections as explained above may be formed in the inner surface of the outer casing while the wedge member or other clamp member cooperating with said groove is provided with a groove having the same cross section through its whole length.

A rope clamp according to the invention may also be provided thereby that it consists of a sleeve at least the one inner face of which is provided with a longitudinal groove having different cross sections as explained above, which sleeve is when the rope portion or rope portions are arranged therein compressed, for example in a swaging device, in such a manner that the said inner face and the inner face opposite said inner face are pressed towards each other and thereby brought to embrace the rope portion or the rope portions and so that for this compression a pressure is used sufficiently heavy to provide an inelastic deformation so that after the compression the sleeve retains its shape given by the compression.

A very simple rope clamp according to the invention and usable as a cable end clamp or the like may consists of two clamp members having grooves shaped for example as shown in FIGS. 2 and 3, but preferably without ribs 46 and adapted to be held together by means of screws or bolts. At all events in connection with wires or cables having a diameter not greater than 16 mm. two such clamp members made from a hard metal, for example steel, can be pressed together embracing the rope, for example in a vice, and after the pressing together be interconnected by means of the screws or bolts. The latter only demand to be dimensioned in such a manner that they can withstand the forces necessary to withhold the clamp members pressed together, which forces are much minor than the forces necessary for pressing two clamp members together and deforming of the wire rope, and, therefore, the screws or bolts and also the clamp members themselves may have minor dimensions than was the case if the clamp members should be pressed together by means of the bolts or screws.

Still further the invention may also be used in connection with rope clamps provided with more than two clamp members, for example in connection with rope clamps comprising three or four clamp members and also in these cases the important increased clamping effect is obtained.

We claim:

1. A rope clamp for gripping or securing at least one rope or cable portion, comprising at least two clamp members adapted to be pressed towards each other, and means adapted to keep said two clamp members pressed towards each other, an internal groove extending through the length of each said clamp member, said grooves cooperating when said two clamp members are together to form a passage for receiving the rope or cable portion or portions, each said groove being adapted receive a rope or cable portion, at least one of said grooves being formed with a first, a second and a third groove portion, said second groove portion having a transverse cross section differing from the transverse cross section of said first groove portion and different from the cross section of said third groove portion thereby that said second groove portion has a major width greater than the major width of said first groove portion as well as of said third groove portion but a major depth smaller than the major depth of said first groove portion as well as of said third groove portion.

2. A rope clamp as claimed in claim 1, said second groove portion having a wedge shaped transverse cross section.

3. A rope clamp for gripping or securing at least one rope or cable portion, comprising at least two clamp members adapted to be pressed towards each other and means adapted to keep said two clamp members pressed towards each other, an internal first groove extending through the length of one of said clamp members, an internal second groove extending through the length of the second of said clamp members, said grooves cooperating when said two clamp members are together to form a passage for receiving the rope or cable portion or portions, each said groove being adapted to receive a rope or cable portion, at least said first groove being formed with a first and a second groove portion, said second groove portion having a major width greater than the major width of said first groove portion, said second groove portion having a bottom wall and side walls, a transverse rib extending inwards from said side walls and outwards from said bottom wall, said rib having top faces, said top faces defining a third groove portion arranged within said second groove portion, said third groove portion having a major width greater than the major width of said first groove portion and a major depth smaller than the major depth of said first groove portion.

4. A rope clamp as claimed in claim 3, said second groove portion having a major depth outside said rib smaller than said major depth of said first groove portion but greater than said major depth of said third groove portion.

5. A rope clamp for gripping or securing at least one rope portion or cable portion, comprising at least two clamp members adapted to be pressed towards each other, and means adapted to keep said two clamp members pressed towards each other, an internal groove extending through the length of each said clamp member, said grooves cooperating when the said clamping members are together to form a passage for receiving the rope or cable portion or portions, each said groove being adapted to receive a rope or cable portion, at least one of said grooves being formed with at least a first and a second groove portion, said first groove portion having a cross section different from the cross section of said second groove portion, said first groove portion having a major width greater than the major width of said second groove portion and a major depth smaller than the major depth of said second groove portion, said first groove portion having inner faces, said inner faces being provided with transverse ribs, said ribs being made from a material having a yield point essentially lower than the yield point of steel.

6. A rope clamp for gripping or securing at least one rope or cable portion, comprising at least two clamp members adapted to be pressed towards each other, and means adapted to keep said two clamp members pressed towards each other, an internal groove extending through the length of each said clamp member, said grooves cooperating when said two clamp members are together to form a passage for receiving the rope or cable portion or portions, each said groove being adapted to receive a rope or cable portion, at least one of said grooves being formed with a first, a second and a third groove portion, said second groove portion having a cross section different from the cross section of said first groove portion and different from the cross section of said third groove portion, said second groove portion having a major width greater than the major width of said first groove portion and greater than the major width of said third groove portion, said second groove portion having a major depth smaller than the major depth of said first groove portion and smaller than the major depth of said third groove portion, said first and said third groove portion having U-shaped cross sections, said second groove portion having a V-shaped cross section.

7. A rope clamp for gripping or securing at least one rope or cable portion, comprising at least two clamp members adapted to be pressed towards each other, and means adapted to keep said two clamp members pressed towards each other, an internal groove extending through the length of each said clamp member, said grooves cooperating when said two clamp members are together to form a passage for receiving the rope or cable portion or portions, each said groove being adapted to receive a rope or cable portion, at least one of said grooves being formed with a first, a second and a third groove portion, said second groove portion having a cross section different from the cross section of said first groove portion and different from the cross section of said third groove portion, said second groove portion having a major width greater than the major width of said first groove portion and greater than the major width of said third groove portion, said second groove portion having a major depth smaller than the major depth of said first groove portion and smaller than the major depth of said third groove portion, said second groove portion having a sectional area smaller than the sectional area of said first groove portion and smaller than the sectional area of said third groove portion.

8. A rope clamp as claimed in claim 7, said third groove portion having a sectional area smaller than the sectional area of said first groove portion.

9. A rope clamp as claimed in claim 7, said first groove portion having a cross section equal to the cross section of said third groove portion.

10. A rope clamp for gripping or securing at least one rope portion or cable portion, comprising at least two clamp members adapted to be pressed towards each other, and means adapted to keep said two clamp members pressed towards each other, an internal groove extending through the length of each said clamp member, said grooves cooperating when the said clamp members are together to form a passage for receiving the rope or cable portion or portions, each said groove being adapted to receive a rope or cable portion, at least one of said grooves being formed with at least a first and a second groove portion, said first groove portion having first inner faces adapted to engage a rope or cable portion, said second groove portion having second inner faces adapted to engage another rope or cable portion, said first inner faces defining a first transverse cross section of said first groove portion, said second inner faces defining a second transverse cross section of said second groove portion, said first transverse cross section and said second transverse cross section being of different shape, said first transverse cross section having a major width greater than the major width of said second transverse cross section, but a major depth smaller than the major depth of said second cross section, said groove being formed with a third groove portion between said first groove portion and said second groove portion, said third groove portion having third inner faces, said third inner faces forming even transitions between said first inner faces and said second inner faces.

References Cited in the file of this patent

UNITED STATES PATENTS

| | | |
|---|---|---|
| 237,272 | Heaton | Feb. 1, 1881 |
| 522,575 | Allenson | July 10, 1894 |
| 1,710,243 | Rohrer | Apr. 23, 1929 |

FOREIGN PATENTS

| | | |
|---|---|---|
| 1,258,632 | France | Mar. 6, 1961 |